United States Patent [19]

Ueda et al.

[11] Patent Number: 5,485,257
[45] Date of Patent: Jan. 16, 1996

[54] IMAGE FORMING APPARATUS WITH ENDLESS TRANSFER MEMBER

[75] Inventors: Masahide Ueda, Takatsuki; Tomoo Izumi; Hiroyuki Yamasaki, both of Amagasaki; Atsuto Hirai, Ikoma; Masahiko Matsuura; Eiichi Sano, both of Takatsuki; Yoshihisa Terasaka, Suita; Masami Yamada, Osaka; Satoshi Yoshida, Itami, all of Japan

[73] Assignee: Minolta Co., Ltd., Osaka, Japan

[21] Appl. No.: 326,003

[22] Filed: Oct. 19, 1994

[30] Foreign Application Priority Data

Oct. 20, 1993 [JP] Japan .................................. 5-262576

[51] Int. Cl.⁶ .................................................. G03G 15/14
[52] U.S. Cl. .......................... 359/272; 355/208; 355/271; 355/273; 355/326 R
[58] Field of Search .................... 355/271–273, 355/208, 326 R, 327, 203, 204, 274, 275

[56] References Cited

U.S. PATENT DOCUMENTS

| | | | |
|---|---|---|---|
| 4,074,934 | 2/1978 | Satomi | 355/272 X |
| 4,140,386 | 2/1979 | Satomi | 355/272 X |
| 4,330,197 | 5/1982 | Smith et al. | 355/145 H |
| 4,712,906 | 12/1987 | Bothner et al. | 355/3 TR |
| 4,899,196 | 2/1990 | Mahoney | 355/271 |
| 5,117,261 | 5/1992 | Sakai et al. | 355/207 |
| 5,138,398 | 8/1992 | Yamada | 355/326 |
| 5,164,781 | 11/1992 | Terashima et al. | 355/272 |
| 5,296,897 | 3/1994 | Amemiya et al. | 355/208 |
| 5,335,056 | 8/1994 | Muramatsuo | 355/327 |
| 5,379,098 | 1/1995 | Bennett et al. | 355/271 |

FOREIGN PATENT DOCUMENTS 2-53084 2/1990 Japan .
2-247663 10/1990 Japan .

Primary Examiner—Matthew S. Smith
Attorney, Agent, or Firm—Willian Brinks Hofer Gilson & Lione

[57] ABSTRACT

The present invention relates to a method of producing a plurality sets of prints from a plural-page original in an image forming apparatus having an endless transfer member onto which images are transferred from an image retaining member. The endless transfer member is operable to support a predetermined number (X) of images during one cyclic movement thereof. In this method, a first printing operation is executed in which the predetermined number (X) of images of a first page of the original are formed on the endless transfer member during one cyclic movement thereof when a desired number (Y) of sets of prints exceeds said predetermined number (X). Second, the first printing operation is repeated until a remaining number (M) of image(s) of the first page becomes less than said predetermined number (X). Third, a second printing operation is executed in which the remaining number (M) of image(s) of the first page and a calculated number (X-M) of image(s) of a second page of the original are formed on said endless transfer member during one cyclic movement thereof after the remaining number (M) of image(s) of the first page becomes less than the predetermined number (X).

22 Claims, 10 Drawing Sheets

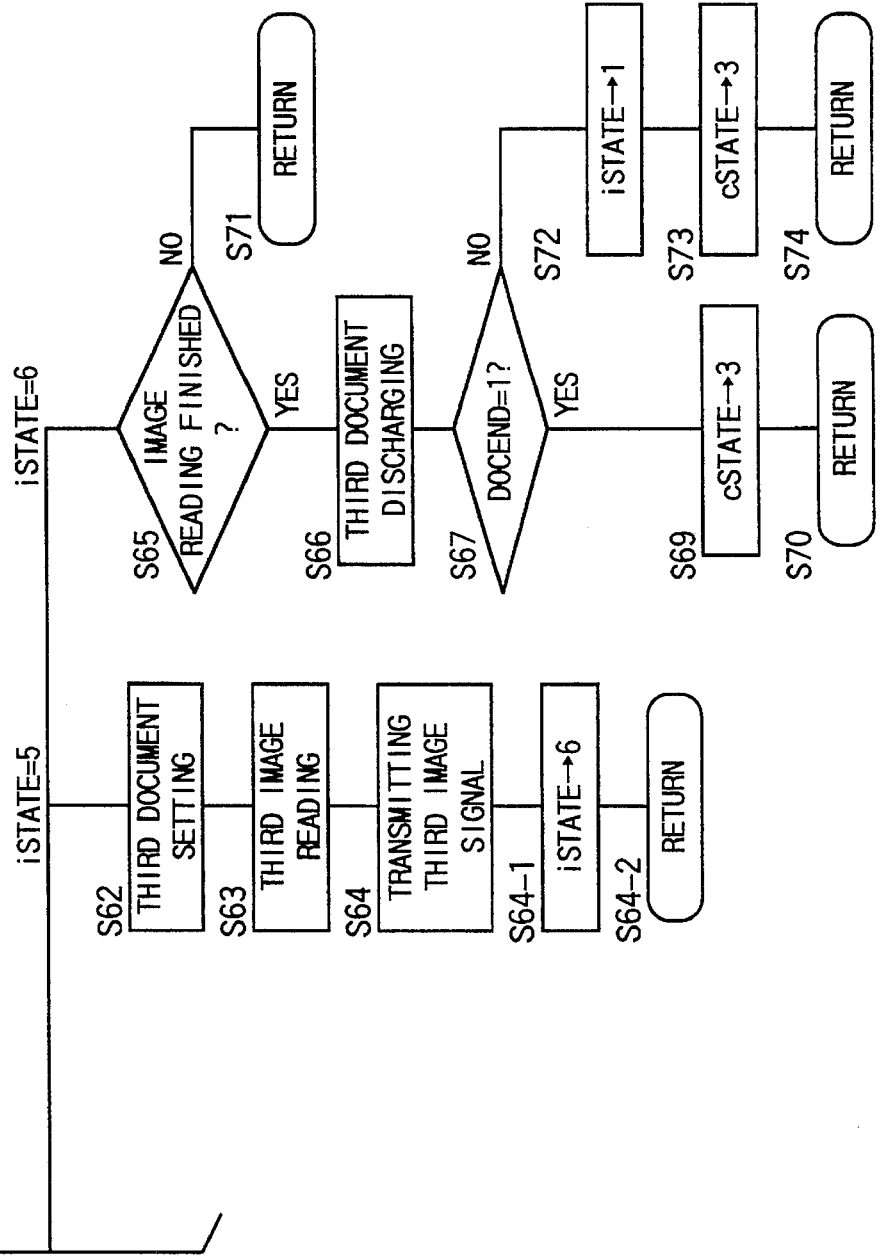

IMAGE FORMING APPARATUS WITH ENDLESS TRANSFER MEMBER

BACKGROUND OF THE INVENTION

1. Field of the Invention

The present invention relates to an image forming apparatus which comprises an endless transfer member capable of bearing thereon either a plurality of images of a specific size or a plurality of sheets of a specific size on which respective images are supported.

2. Description of the Prior Art

In most image forming apparatus such as copiers or printers, a toner image formed on a photoconductor or photoreceptor is transferred onto a sheet. Also, in multi-color image forming apparatus, a plurality of images having different colors, respectively, are successively transferred so as to superimpose one above the other on the same region of one sheet.

To superimpose a plurality of toner images on the sheet, U.S. Pat. No. 5,138,398 discloses an endless transfer drum capable of supporting a sheet onto which the toner images are transferred. In an image forming apparatus comprising such transfer drum, toner images formed on the photoconductor are transferred onto the sheet supported on the transfer drum. By introducing the sheet into a transfer region where the photoconductor faces the transfer drum repeatedly, the toner images are transferred onto the sheet so as to superimpose one above the other.

Further, to superimpose two toner images on the same sheet for forming a composite image, Japanese Patent Laid-open Publication No. Hei 2-247,663 discloses an image forming apparatus employing an endless transfer belt capable of supporting a sheet thereon.

Furthermore, U.S. Pat. No. 5,117,261 discloses another endless transfer belt on which a plurality of toner images of different colors are directly transferred and superimposed so as to form a multi-color image, the multi-color image thus formed on the transfer belt is then transferred onto the sheet in a lump.

The transfer member, i.e., the endless transfer drum or endless transfer belt described above has a circumferential length corresponding to the maximum possible size of sheets which can be printed by the image forming apparatus. Therefore, although in making an image on the maximum-size sheet the circumference of the transfer member is almost occupied by the sheet, making an image on a sheet of a smaller size allows the sheet to occupy only a part of the circumference, resulting, in an increase of waste time during which the transfer member does not contribute to the transfer.

U.S. Pat. No. 4,712,906 discloses an image forming apparatus wherein the endless transfer drum is so designed as to support one legal-size sheet or two letter-size sheets. In this image forming apparatus, even in the image forming using sheets of a letter size, the circumference of the transfer drum is almost covered by the sheets so that an efficient image forming process may be accomplished. However, this prior art does not refer to a controlling sequence for making a plurality sets of copies of a plurality of documents.

SUMMARY OF THE INVENTION

It is therefore an object of the present invention to provide an improved image forming apparatus having an endless transfer member which ensures an image forming with a higher efficiency and an image forming method thereof.

It is another object of the present invention to provide an image forming apparatus which is advantageously utilized to make a plurality sets of prints from a multi-page original.

It is also a further object of the present invention to provide an image forming apparatus having a transfer member capable of supporting three or more images during one cycle of movement thereof.

An additional object of the present invention is to provide an image forming apparatus having an endless transfer member capable of supporting a plurality of images, wherein the timing between a receipt of information of document image and an operation of image forming is controlled.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, in which:

FIG. 8a, 8b, and 8c are flowcharts depicting an image reading process of the copy machine according to the present invention.

DETAILED DESCRIPTION OF THE PREFERRED EMBODIMENTS

Figure 1:
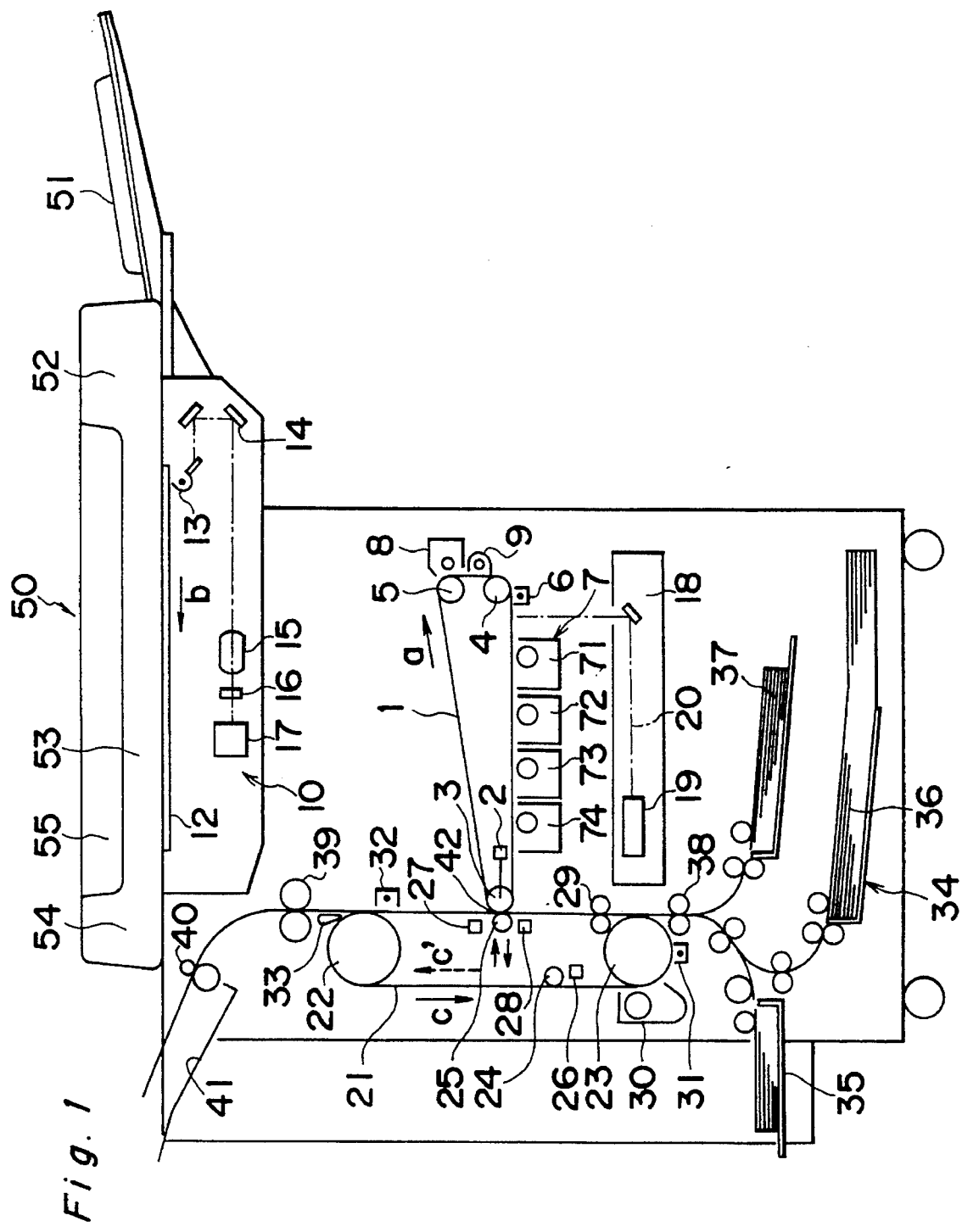
FIG. 1 is a schematic side sectional view of the copy machine according to the present invention.

Referring to FIG. 1, there is shown a multi-color copy machine 1 according to the present invention. The copy machine 1 comprises an automated document feeder 50 on its body. The document feeder 50 has a document tray on which a plurality of documents to be copied are placed. These documents are fed one by one by a feeding station 52 to a transporting station 53 and then positioned on a glass platen 12. An image of the document placed on the platen 12 is read by an image reader 10 which is arranged below the glass platen 12. After completion of the image reading, the document is transported by the transporting station 53 and subsequently discharged onto a sheet recovery tray 55 through a discharging station 54.

The image reader 10 comprises an optical system including a lamp 13, mirrors 14, and lens 15 and a line sensor 16. The lamp 13 scans in a direction indicated by an arrow b for illuminating incremental portions of the document placed on the glass platen 12 so that a beam of light reflected from the document travels through the mirrors 14 and the lens 15 and then impinges on the line sensor 16. The line sensor 16 analyzes the beam into three original color signals, i.e., red-, green-, and blue-color signals. These signals are transmitted to an image processing circuit 17. This circuit 17 converts these signals into four image signals, i.e., yellow-, magenta-, cyan-, and black-image signals, as will be described later, and then transmits these signals to an exposure unit 18. The exposure unit 18 comprises a laser emitting device 19 which emits a laser beam generated on the basis of the image signals from the circuit 17 to make an electrostatic latent image on the photoconductor 1.

The photoconductor 1, which is disposed in about the central portion of the copy machine, comprises an endless-belt having a photosensitive layer on its outer surface. This belt is trained around three rollers 3, 4, and 5 so as to move in a direction indicated by arrow a. For this purpose, the roller 3 is drivingly coupled with a motor not shown. Also, the roller 3 has a sensor 2 associated therewith for detection of the rotation thereof. Disposed around the photoconductor 1 are a charger 6, a developing unit 7, a cleaning unit 8, and an erasing lamp 9. The developer unit 7 comprises four developers 71, 72, 73, and 74 containing of yellow-, magenta-, cyan-, and black-toner, respectively. Each developer are capable of being selectively brought into one of a developing state and a non-developing state by a changeover means not shown.

A transfer belt 21 is trained around a drive roller 22, which is connected to a drive motor (not shown), and a driven roller 23 disposed below the roller 22, so as to extend vertically between the two rollers 22 and 23. Tension of the transfer belt 21 can be adjusted by a movable tension roller 24 which is arranged inside the transfer belt 21. Also arranged inside the transfer belt 21 is a movable transfer roller 25 facing the roller 3 and supported for movement close towards and away from the roller 3 such that, when the roller 25 is moved close towards the roller 3, the transfer belt 21 is brought into contact with the photoconductor 2, but when it is moved away from the roller 3, the transfer belt 21 is disengaged from the photoconductor 1. A sensor 26 is disposed adjacent the tension roller 24, and sensors 27 and 28 are disposed above and below the transfer roller 25, respectively, so as to detect passage of the sheet supported on the outer surface of the transfer belt 21. A pair of assist rollers 29 are arranged below the transfer roller 25 so as to nip the sheet to adhere to the transfer belt 21. Arranged outside the transfer belt 21 are a belt cleaner 30 capable of touching a portion of the transfer belt 21 where it is supported on the driven roller 23, a charger 31 for electrostatically charging the outer surface of the transfer belt 21, an erasing charger 32 for erasing a residue electrostatic charge from the outer surface of the transfer belt 21, and a separation nail 33 capable of touching a portion of the outer surface of the transfer belt 21 where it is supported on the drive roller 22.

A sheet supply unit 34 includes three feeders or cassettes 35, 36 and 37 in order to feed a designated sheet from one of these cassettes 35, 36 and 37. The unit 34 also includes timing rollers 38 operable to transport the sheet, fed from any one of the cassettes 35 to 37, towards the transfer belt 21 in synchronism with movement of the toner image formed on the photoconductor 1.

A fuser 39 and a discharging roller 40 are disposed above the transfer belt 21 so that the sheet having been detached from the transfer belt 21 and then passed through the fuser 39 is discharged onto a sheet recovery tray 41 by the discharging roller 40.

Figure 2:
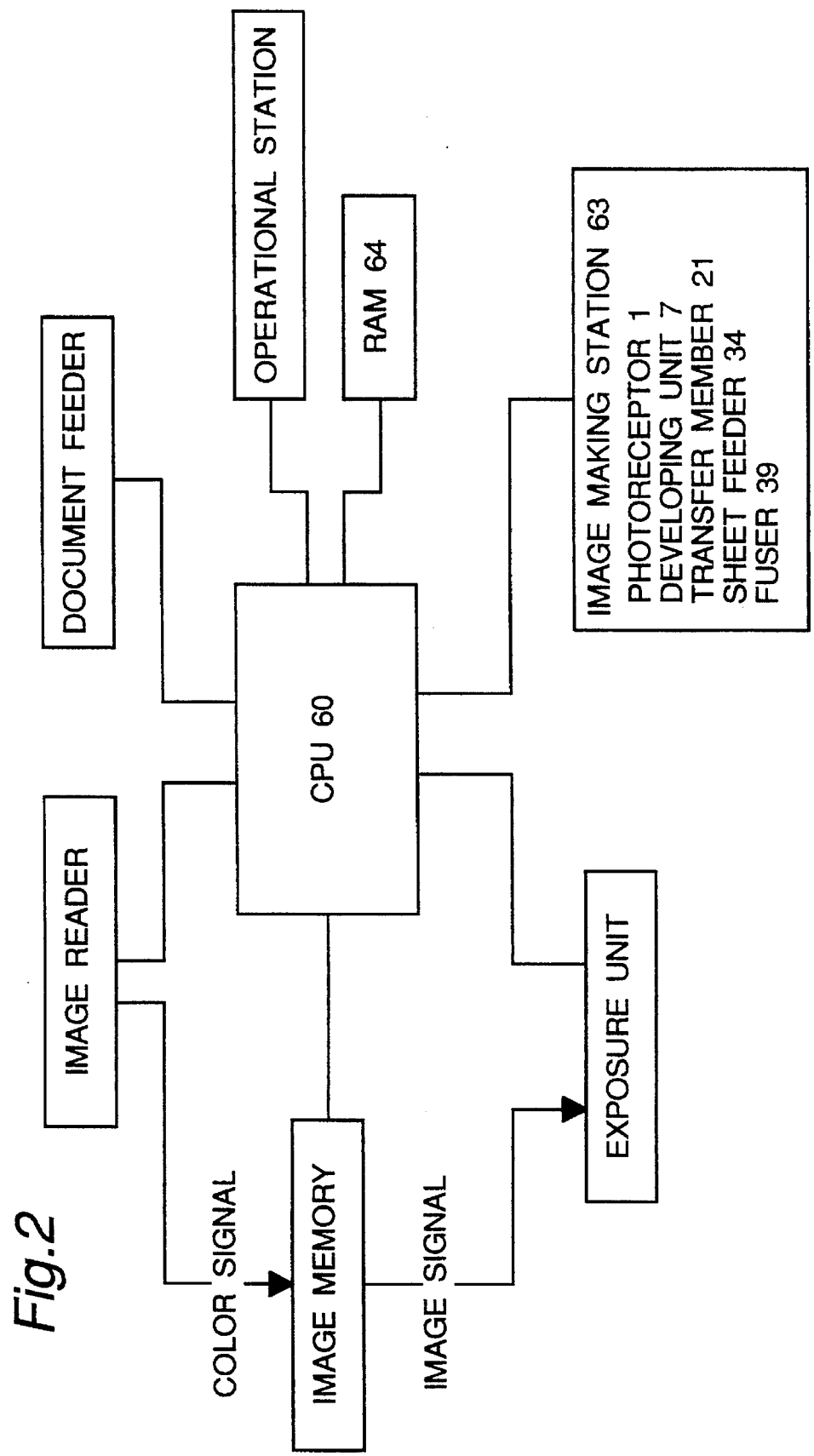
FIG. 2 is a block diagram showing a control circuit of the copy machine.

Referring particularly to FIG.2, there is shown a schematic block diagram of the multi-copy machine. A microcomputer or controller (CPU) 60 generally controls the copy making process. This CPU 60 is electrically coupled with the document feeder 50, the image reader 10, the exposure 18, the image memory 61, an operating station 62, and an image making station 63 by way of communication lines, respectively. This image making station 63 consists of the photoconductor 1, the developing unit 7, the transfer member 21, the sheet feeder 34, the fuser 39, and the like.

The CPU 60, upon receiving an instructive signal for starting a copy making, transmits control signals to the document feeder 50, the image reader 10, the exposure unit 18, and the image making station 63, respectively. The image memory 61 stores the image signals and then transmits them to the exposure unit 18 according to a specific image making timing.

The operating station 62 feeds to the CPU 60 information on the number of copies, the size of a sheet to be copied, and conditions such as magnification, as well as the instruction by the operator for starting the copy making.

The document feeder 50 comprises a microcomputer which is electrically coupled with the CPU 60 by way of a communication line (not shown) so as to control the document feeding station 52, document transporting station 53, and discharging station 54. Based upon the signal which the CPU 60 issues indicating that the document has already been disposed on the tray 51, the microcomputer of the document feeder 50 instructs the feeding station 52 and transporting station 53 to feed out the document and then place it on the glass platen 12. When the document is placed at a specified position on the platen 12, the microcomputer transmits a signal to the CPU 60, which indicates that the document has already been set on the specified position on the platen 12. Also, upon receiving a signal which indicates the image reading has already finished, the microcomputer instructs the transporting station 53 and the discharging station 54 to discharge the document onto the platen 12 to the sheet recovery tray 55. Then, if all the documents has been fed to the platen 12, the microcomputer set a document-end-flag (DOCEND) to "1" and feeds a corresponding signal to the CPU 60.

The image reader 10 also comprises its dedicated microcomputer which is electrically coupled with the CPU 60 by way of a communication line (not shown). This microcomputer controls the scanning and illumination of the lamp 13 for reading the image of the document placed on the platen 12, the transmission of each color signal to the image processing circuit 17, another transmission of the color signal to the image memory 61 through a communication line for its exclusive use, and the like. After being added page data, the image data of each color converted at the image processing circuit 17 is stored in the image memory 61.

The image memory 61 coupled with the CPU 60 through a communication line (not shown) transmits the image data of the designated page to the exposure unit 18 according to a timing signal when it receives a signal for starting an exposing operation from the CPU 60. Also, the image memory 61 eliminates the image data of the designated page on the basis of a specific signal from the CPU 60.

The exposure unit 18, which is also coupled with the CPU 60 through a communication line, modulates the image data of the designated page from the image memory into a signal for controlling the laser beam which will be exposed on the outer periphery of the photoconductor 1 according to the timing signal for image making.

Operation of the multi-color copy machine for making copies of multi-color will now be discussed. Documents (not shown) to be copied are placed on the document tray 51 of the document feeder 50. When a print switch (not shown) is turned on, the document is fed one by one from the first page onto the predetermined portion of the platen 12. The image reader 10 reads the image of each document and makes color signals of the image. The color signals are converted into four image signals, yellow-, magenta-, cyan-, and black-signals, which are then transmitted to the exposure unit 18. Based on the image signals, the exposure unit 18 emits respective laser beams 20 corresponding to the yellow-, magenta-, cyan-, black-color signals one by one in this sequential order.

The photoconductor 1 is driven by the roller 3 so as to move in the direction indicated by arrow a, and an outer surface thereof is charged to a predetermined potential at a location where the charger 6 faces the photoconductor 1. The laser beams 20 emitted from the exposure unit 18 are projected onto the charged region of the outer surface of the photoconductor 1 so that electrostatic latent images one for each color are successively formed. These electrostatic latent images associated respectively with four colors are developed by the respective developers 71, 72, 73 and 74 into toner images. The rotation of the photoconductor 1 is detected by pulses generated by the detective sensor 2 upon each complete rotation of the roller 3, and the exposure unit 18 emits laser beams 20 in a timed relationship with the pulse signals.

The transfer belt 21 is driven by the roller 22 which starts rotation on the basis of a turn-on signal of the print switch so as to advance in the direction indicated by arrow c, and the outer surface thereof is cleaned by the belt cleaner 30 and then charged to a predetermined potential by the charger 31. The sheet fed from any one of the sheet feeder 35, 36 and 37 is held still by the timing roller pair 38 for a time, and is then supplied onto the outer surface of the transfer belt 21 so as to adhere thereto by the effect of an electrostatic force of attraction with a timed relationship with the toner image formed on the photoconductor 1. Adhesion of the sheet is secured as the belt 21 carrying the sheet is passed through the nipping region of the pair of assist rollers 25.

The sheet supported on the transfer belt 21 is further transported in the direction indicated by arrow c. When the front edge of the sheet is detected by the sensor 28, the transfer roller 25 moves from left to right towards the photoconductor 1 so that the transfer belt 21 supporting the sheet is brought into contact with the photoconductor 1. Consequently, the yellow toner image on the photoconductor 1 is firstly transferred onto the sheet on the transfer belt 21 at a transfer station 42 where the transfer belt 21 contacts the photoconductor 1. Then, when the sheet having yellow toner image circulates together with the belt 21 and is then brought again to the transfer station 42, the magenta toner images on the photoconductor 1 is transferred onto the sheet so as to superimpose on the yellow toner image on the sheet. Further, the cyan toner image and black toner images are sequentially transferred and superimposed on the yellow and magenta toner images to eventually form a multi-color toner image.

The sheet to which each color image has been transferred is, after the electrostatic force has been lessened by the erasing charger 32, detached from the transfer belt 21 by the separation nail 33. The separated sheet is subsequently transported through the fuser 39 to fix the toner images thereon, and is finally discharged onto the sheet recovery tray 41 by the roller 40.

Residual toner particles which have not been transferred to the sheet at the transfer station 42 are removed by the cleaner 8. Further, residual charge on the transfer belt 21 is erased by the erasing lamp 9.

Although reference has been made to the copy making process in which the transfer belt supports only one sheet thereon, the transfer belt 21 may support thereon a plurality of sheets simultaneously. When the transfer belt has a circumferential length of 840 mm, the number of sheets (X) which can be supported on the outer periphery of the belt 21 are shown in Table 1. In this Table 1, "L-" represents the longitudinal direction, and "T-" represents the transverse direction. It should be noted that an A3-sized sheet will be arranged on the transfer belt 21 with its longitudinal edges oriented in the direction of the movement of the transfer belt 21, while A4-, A5- and A6-sized sheets will be arranged on the transfer belt 21 with its transverse edges oriented in the direction of the movement of the transfer belt 21.

TABLE 1

| Sheet & sheet size | Number of sheets (X) |
|---|---|
| A3 (L-420 mm) | 1 |
| A4 (T-210 mm) | 3 |
| A5 (T-150 mm) | 4 |
| A6 (T-105 mm) | 5 |

This copy machine is so designed that, in a copy mode in which a plurality of copies are made for respective pages of original documents, even though the number of copies of each page is less than X, the transfer belt 21 always supports X sheets on its outer surface, i.e., not only sheets required for one-page copy making but also one or more sheets for part of next-page copy making.

In other words, when the number of sets of copies is expressed by Y for each page, and where the following relation establishes:

$$Y = N \cdot X + M$$

(wherein M and N represent respective positive integers, M being smaller than X), the copy making for (N·X) sheets is first done by repeating N cycles of copy process in which X sheets are supported on the transfer belt 21, and then the copy making for the remaining (M) sheets is done in the subsequent (N+1)th copy process, in which the transfer belt 21 also supports X sheets and the image of the next page of the original document to be copied is reproduced on the (X-M) sheets.

Figure 3:
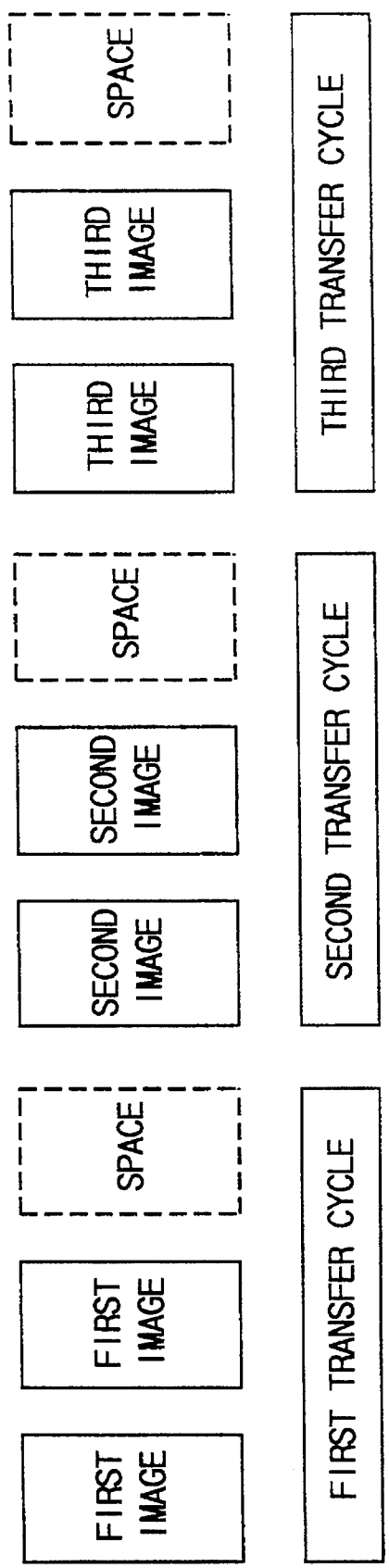
FIG. 3 shows a relationship between a transfer cycle and sheets supported on a transfer belt in a comparative example.

For comparison purpose, there is shown in FIG. 3 a comparative example for reproducing a plurality of copies for respective pages of original documents, in which the relationship between transfer cycles and sheets supported on the transfer belt in each transfer cycle is illustrated. As shown, according to the comparative example, if the number of copies for each page of the document is less than the maximum number of sheets to be supported on the transfer belt, i.e., two sheets in this example with the maximum number of sheets being three, there exists a vacant space where no sheet is supported on the transfer belt. As a result, when, for example, making two copies for three pages of documents, three transfer cycles should be carried out. It should be noted that, in each transfer cycle, the transfer belt makes four rotations so as to transfer four toner-images, i.e., yellow-, magenta-, cyan-, and black-toner images, onto each sheet supported on the transfer belt.

Next, the transfer process of the embodiment will be discussed below. Assume that the sheets of A4-size are arranged on the transfer belt with its transverse edges oriented in direction of the movement of the transfer belt. As mentioned before, three of the A-4 sized sheets can be supported on the transfer belt.

Operation Example 1

Figure 4:
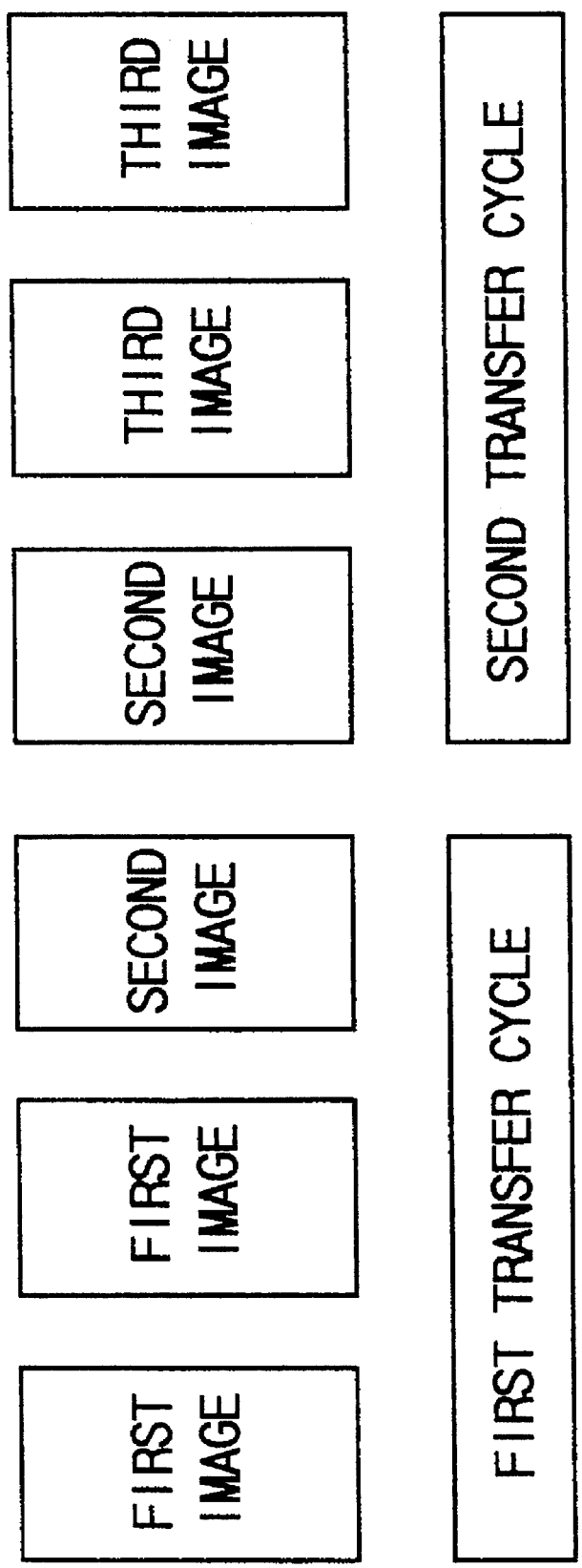
FIG. 4 shows a relationship between the transfer cycle and the sheets supported on the transfer belt of the first embodiment.

FIG. 4 shows a transfer process of making two copies of each of three pages of documents. In this transfer process, in the first transfer cycle, the transfer belt 21 supports three sheets; two sheets for the first page of documents and the remaining one sheet for the second page of documents, to which four color-toner images are transferred on the basis of image signals of corresponding pages of documents. In the second transfer cycle, the transfer belt 21 also retains three sheets; one sheet for the second page and the remaining two sheets for the third page, each of which four color-toner images are transferred thereto on the basis of image signals of corresponding pages. As described before, to make two copies of each of the three pages of documents, three cycles of transfer process are required in the comparative example, while only two cycles of transfer process are sufficient in the embodiment, which results in a speeding up of copy making.

Operational Example 2

Figure 5:
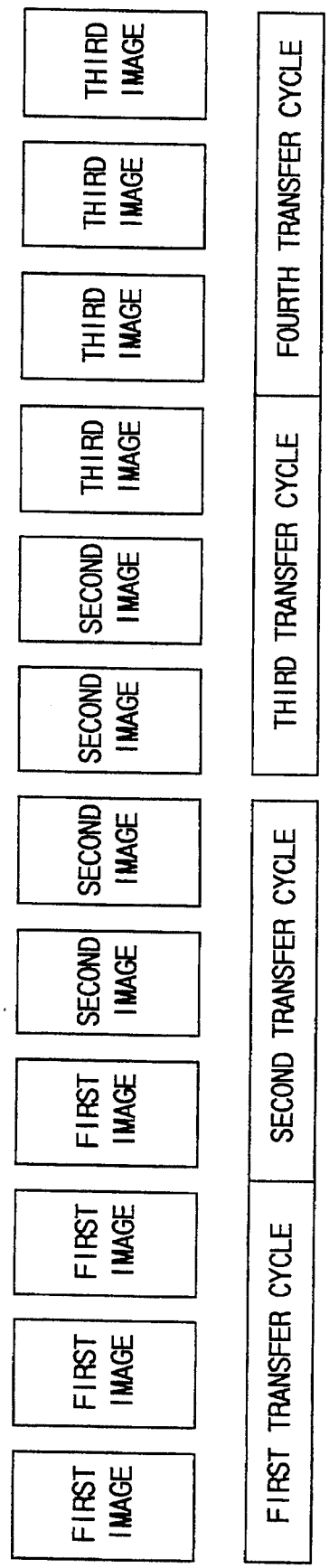
FIG. 5 shows a relationship between the transfer cycle and the sheets supported on the transfer belt of the second embodiment.

FIG. 5 shows another transfer process of making four copies of each of three pages of documents. According to this process, in the first transfer cycle, three copies for the first page is executed. In the second transfer cycle, the transfer belt 21 retains three sheets; one sheet for the first page and the remaining two sheets for the second page, to which four color-toner images are transferred on the basis of the image signal of corresponding pages. In the third cycle, the transfer belt 21 also retains three sheets; two sheet for the second page and the remaining one sheet for the third page, to which four color-toner images are transferred on the basis of image signal of corresponding page. Further, in the fourth cycle, the transfer belt 21 retains three sheets for the third page, to which four color image of fourth document are transferred, respectively.

Operational Example 3

When making one copy of each of three pages of documents, the transfer belt supports three sheets simultaneously and images of first, second, and third pages are reproduced on respective sheets. That is, each copy making for the three pages is carried out through only one transfer cycle.

Figure 6:
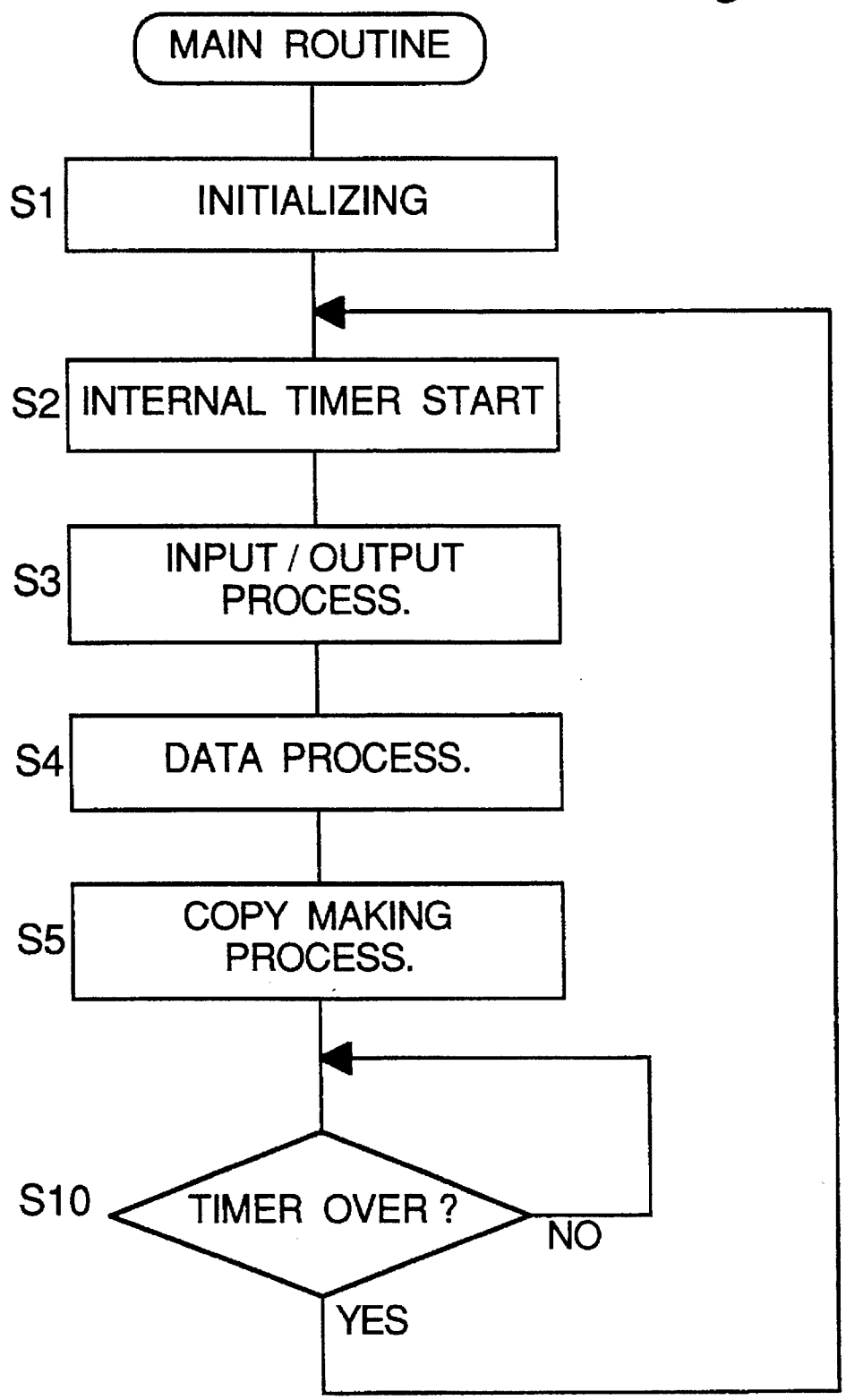
FIG. 6 is a flow chart showing a main routine of a CPU of the copy machine.

Referring now to FIGS. 6 to 10, the process of the CPU 60 in the copy making process above mentioned will be discussed below. FIG. 6 shows a main routine of the process executed by the CPU 60. When a power switch (not shown) of the copy machine is turned on, CPU 60 is reset and a program thereof starts. At step S1, the CPU 60 performs initial setting for elimination of data in RAM 64, initializing each register, and setting each unit into initial mode. At step S2, an internal timer starts. This timer regulates a time for carrying out the main routine, which is pre-set in the initial setting of the step S1. Then, at steps S3 to S5, subroutines of input/output processing, data processing, and copy processing are called for one by one. After that, if the internal timer is over at step S10, the program returns to step S2. In the input processing subroutine at step S3, input signals from respective switches are inputted, and necessary signals are transmitted to respective units in the copy machine. In the data processing subroutine at step S4, signals are transmitted from the operating unit 62 to the CPU 60, and vice versa. In the copy processing subroutine at step S5, the actual copy making is carried out based upon signals obtained at step S4.

Figure 7:
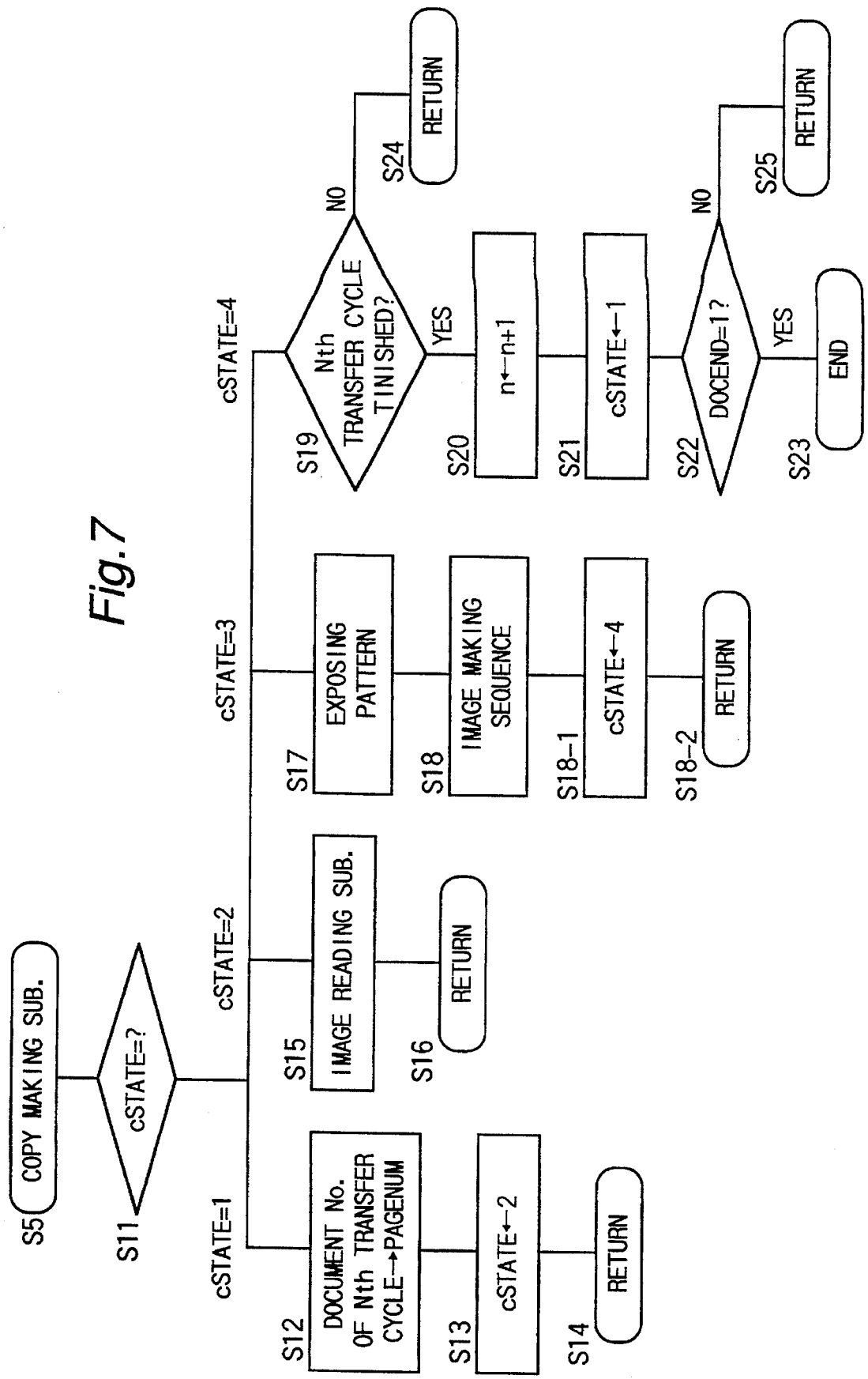
FIG. 7 is a flow chart depicting a copy making process of the copy machine according to the present invention.

FIG. 7 shows a flowchart of the copy processing subroutine. Once this copy processing subroutine is called for at step S5, a copy state number (cSTATE) is verified at step S11. If the state number (cSTATE) is "1" which means that the copy making for the N-th transfer cycle has just started, the CPU 60 memorizes the number of sheets to be supported on the transfer belt 21 in the N-th transfer cycle and the corresponding page or pages whose images are to be copied as a page data PAGENUM. That is, when the program has just started, the number N is set to "1" Then, the number of sheets to be supported on the transfer belt 21 in the first transfer cycle and the corresponding page number or numbers to be copied on the respective sheet are determined and stored as the page data PAGENUM.

For example, in a copy making of two copies of each of three pages of documents as shown in operational example 1, information that three sheets are to be supported on the transfer belt 21 in the first transfer cycle, that the image of the first page should be copied on the former two sheets, and that the second page should be copied on the last sheet, is dealt with and stored as the page data PAGENUM. Then, the number N is incremented so that, in the second transfer cycle in which the copy state is "1", another information that three sheets are to be supported on the transfer belt 21, that the image of the second page should be copied on the first sheet, and that the image of the third page should be copied on the latter two sheets is dealt with and stored as the page data PAGENUM.

Although the discussion is made to the operational example 1, similar process is applied to other operational examples 2 and 3. That is, the number of copies is divided by the number of sheets which can be supported on the transfer belt simultaneously and then the page data PAGENUM is calculated based on the remaining number of the above calculation.

Then, at step S13 the copy state (cSTATE) is set to "2", after that the program returns to the main routine at step S14. When it is determined that the copy state (cSTATE) is "2" at step S12, the image reading subroutine for reading images of the document is called for at step S15, and then the program returns to the main routine at step S16.

In the image reading subroutine at step S15, the document feeder 50, image reading unit 10, and image memory 61 are controlled according to the page data PAGNUM obtained at step S12. This process will be described in detail hereinafter.

If it is determined that the copy state (cSTATE) is "3" at step S11, this means that the image reading of the page to be copied in the N-th transfer cycle has already completed and, therefore, the program proceeds to a step S17. At step S17, according to the page data PAGENUM determined at step S12, an exposing pattern is transmitted to the image memory 61 and the exposure 18 to output image data for three sheets in synchronism with the image making sequence.

At step S18, after starting the image making process according to a control sequence of the image making unit 63, the program sets the copy state (cSTATE) to "4" at step S18-1 and returns to the main routine at step S18-2.

If it is determined that the copy state (cSTATE) is "4" at step S11, this means that the copy machine is carrying out the copy making operation and, therefore, a decision is made whether the copy making for the N-th transfer cycle which is now performing is completed at step S19. If so, the number N is incremented at step S20 and then the copy state (cSTATE) is set to "1" at steps S20 to S21. If not, the program returns to the main routine at step S24.

At step S22, a decision is made whether the document end flag (DOCEND) made at the document feeder 50 is "1". If so, that is, it is determined that all the documents placed on the tray have been fed out, the copy making is completed at step S23. If, however, the any document still remains on the tray, the program returns to the main routine at step S25.

Figure 8A:
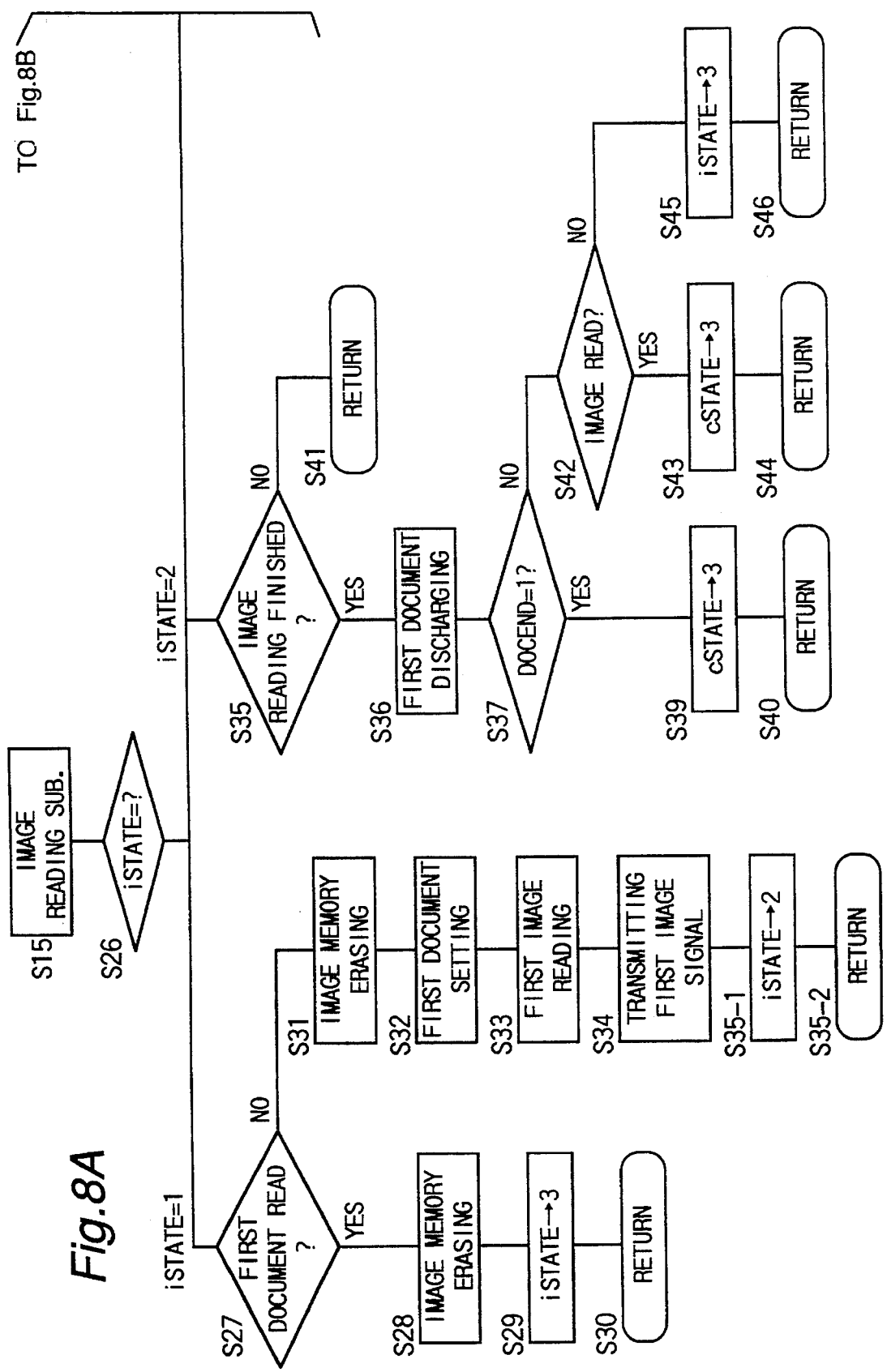
Figure 8B:
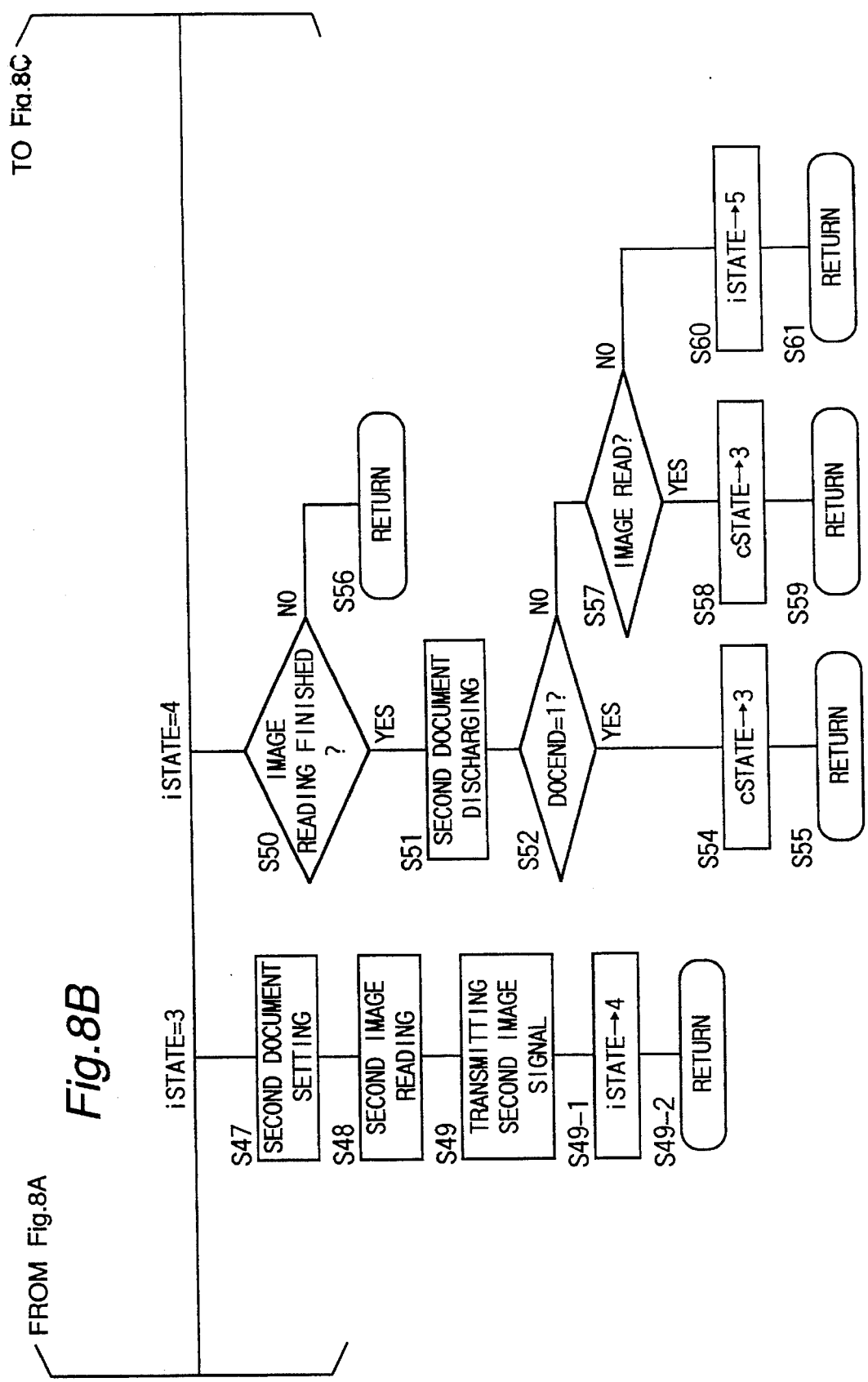

Referring to FIGS. 8a, 8b, and 8c, there is shown flow-charts depicting the operation of the image reading by the CPU 60. In this operation, when the image reading subroutine is called for at step S15 in the copy subroutine, the state of an image scan state (iSTATE) is determined at step S26. When the image scan state (iSTATE) is "1", at step S27, the first page of documents determined at step S12 to be copied in the N-th transfer cycle, i.e., the first page to be reproduced in the transfer which is now carrying out, is determined by the page data PAGENUM, and then it is determined whether the image of the page to be copied has already been read and the corresponding image signals have been memorized in the image memory 61. If it is determined that the image signals have already been memorized, the image signals other than that of the page to be copied are erased from the image memory. Then, after the image scan state (iSTATE) is set to "3" at step S29, the program returns to the copy process subroutine at step S30.

If it is determined at step S27 that the image signals have not been memorized in the image memory, all the image signals are erased from the image memory 61. Then, a signal is transmitted to the document feeder 50 so that the document to be copied on the first sheet in the N-th transfer cycle is placed on the platen 12. After the page of documents is set on the platen, signals are transmitted to the image reader 10 to cause this image reader 10 to read the image of the page and then transmits the image data to the image memory 61 at steps S33 and S34. After the state of an image scan state (iSTATE) is subsequently set to "2", the program returns to the main routine at step S35-1.

When it is determined that the image scan state (iSTATE) is "2" at step S26, a decision is made whether the image reading of the first page of documents has finished at step S35. If not, the program returns to the copy making subroutine at step S41. If, however, so, the document feeder 50 is instructed to discharge the first page of documents at step S36.

Next, at step S37, a decision is made whether the document-end flag (DOCEND) is "1", i.e., all documents have already been fed from the document tray 51, after setting the copy state (cSTATE) to "3" at step S39, the program returns to the copy making subroutine at step S40. If, however, the document-end flag (DOCEND) is "0", i.e., the document still remains on the document tray 51, it is determined whether a plurality of documents are copied in the present N-th transfer cycle and the next second document should be read, that is, whether the image of the document has already been read or not.

If the reading of the document has finished, after changing the copy state (cSTATE) to "3" at step S43, the program returns to the copy making subroutine at step S44. If not, after setting the image scan state (iSTATE) to "2", the program returns to the copy making subroutine at step S46.

When it is determined that the image scan state (iSTATE) is "3", the document feeder 50 is instructed to feed out and set the second page of documents on the platen. After setting the document on the platen, a signal is transmitted to the image reader 10 so that the image reader 10 reads the image on the platen and transmits the image signal to the image memory 61 at steps S48 to S49. Then, after the image scan state (iSTATE) is changed to "4" at step S49-1, the program returns to the copy making subroutine at step S49-2.

When the image scan state (iSTATE) is "3", it is determined whether the image reading of the second document has finished at step S50. If not, the program returns to the copy making subroutine at step S56. If, however, so, the image reader is instructed to discharge the document of the platen on the sheet recovery tray at step S51.

Then, a decision is made whether the document-end flag (DOCEND) made at the document feeder 50 is "1", that is, all the images of the documents have already been read, after setting the copy state (cSTATE) to "3", the program returns to the copy making subroutine at step S55. If the document-end flag (DOCEND) is "0", i.e., any document still remains on the document feeder 50, it is determined whether any document to be copied in the present N-th transfer cycle, that is, the image of the third page of the document is required to be read.

If it is not necessary to read the image of the third document and all images of the document to be copied in the present transfer cycle has already read, after setting the copy state (cSTATE) to "3" at step S58, the program returns to the copy making subroutine at step S59. If, however, the image reading has not finished, after setting the image scan state (iSTATE) to "5" at step S60, the program returns to the copy making subroutine at step S61.

When the image scan state (iSTATE) is "5", the document feeder 50 is instructed to feed out the third page of documents and set it on the platen. After setting the page on the platen, the image reader 10 reads the image of the document and then feeds the image data to the image memory 61 at steps S63 and S64. Then, after setting the image scan state (iSTATE) to "6" at step S64-1, the program returns to the copy making subroutine at step S64-2.

When the image scan state (iSTATE) is "6", it is determined whether the image reading of all the pages of the documents has finished at step S65. If not, the program returns to the copy making subroutine at step at S71. If, however, the image reading has finished, the document feeder 50 is instructed to discharge the third page of documents from the platen to the sheet recovery tray.

Then, at step S67, a decision is made whether the document end flag made at the document feeder 50 is "1", that is, all the pages has already been read. If so, after setting the copy state (cSTATE) to "3", the program returns to the copy making subroutine at step 70. If there still exists the document on the document tray of the document feeder, the image scan state (iSTATE) is set to "1" at step S72 and then the copy state (cSTATE) is set to "3" at step S73. After that, the program returns to the copy making subroutine at step S74.

The images having been read as before are reproduced at steps S17 and S18.

As can be seen from the above discussion, in the copy machine of the present invention, the copy making is carried out according to the page data (PAGENUM) determined before each transfer cycle. The page data (PAGENUM) is calculated by the number X of the sheets supported on the transfer belt 21 which is determined by the sheet size and the number Y of copy of each document page, when the copy number Y is less than number X of sheets supported on the transfer belt, the image of the next page is copied on the remaining sheet. In other words, the transfer belt always supports the maximum number X of sheets in the copying process in which a plurality of images are copied for the respective of pages of the documents.

Although in the embodiment of the present invention previously described the belt type transfer member has been employed as the transfer member, a drum-type transfer means such as disclosed in the U.S. Pat. No. 4,712,906 may be used.

Further, this invention may be applied to not only a copy machine, but also to a printer, for which the same controlling process may be carried out other than that image signal of the specified document data or page data required in each printing cycle is transmitted to the image memory from a host computer.

Furthermore, this invention may be applied to an image forming apparatus which includes an intermediate transfer member as such as disclosed in U.S. Pat. No. 5,117,906, wherein toner images are transferred on the intermediate transfer member and then transferred to the sheet from the intermediate transfer member.

Although in the previous embodiment of the present invention each printing cycle is started after reading document images to be copied in each printing cycles, the printing cycle may be initiated after reading a plurality of document images corresponding to the maximum number of sheets to be retained on the transfer belt based on the sheet size. It should be noted that, if the number of documents is less than the maximum number of sheets to be retained on the transfer member, the printing cycle will be initiated after reading all document images.

Also, although in the previous embodiment of the present invention a transfer cycle has been shown as including four rotations of the transfer belt for transferring yellow-, magenta-, cyan-, and black-toner images thereto, a single color image forming can be accomplished in one transfer cycle including only one rotation of the transfer belt.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A method of producing a plurality sets of prints from a plural-page original in an image forming apparatus having an endless transfer member onto which images are transferred from an image retaining member, said endless transfer member being operable to support a predetermined number (X) of images during one cyclic movement thereof, said method comprising:

executing a first printing operation in which said predetermined number (X) of images of a first page of the original are formed on said endless transfer member during one cyclic movement thereof when a desired number (Y) of sets of prints exceeds said predetermined number (x);

repeating said first printing operation until a remaining number (M) of image(s) of the first page becomes less than said predetermined number (X); and executing a second printing operation in which the remaining number (M) of image(s) of the first page and a calculated number (X-M) of image(s) of a second page of the original are formed on said endless transfer member during one cyclic movement thereof after the remaining number (M) of image(s) of the first page becomes less than said predetermined number (X).

2. A method as claimed in claim 1, wherein said endless transfer member supports a plurality of sheets on which images are formed.

3. An image forming apparatus comprising:

an image retaining member;

an image forming mechanism which forms an image on said image retaining member based on original information;

an endless transfer member onto which the image formed on said image retaining member is transferred, said endless transfer member moving along a closed loop through a transfer station faced to said image retaining member and being operable to support a predetermined number of images during one cyclic movement thereof; and a sequence controller which controls an operation of said image forming apparatus to execute, during a multi-printing operation in which a plurality sets of prints are produced based on plural-page original information, a first sequence in which said endless transfer member supports said predetermined number of images all of which are formed based on a same page of the plural-page original information during one cyclic movement thereof and a second sequence in which said endless transfer member supports said predetermined number of images which are formed based on two successive pages of the plural-page original information during one cyclic movement thereof.

4. An image forming apparatus as claimed in claim 3, wherein said image retaining member has a photoconductive layer, and said image forming mechanism includes a charger uniformly providing electric charges onto said photoconductive layer, an optical system optically exposing the photoconductive layer charged by said charger based on the original information to form an electrostatic latent image and a developing device developing the electrostatic latent image with toner to form a toner image.

5. An image forming apparatus as claimed in claim 3, wherein said endless transfer member includes an endless belt which is provided around at least two support rollers.

6. An image forming apparatus as claimed in claim 5, wherein said endless transfer member is operable to support a plurality of sheets on which images formed on said image retaining member are transferred, respectively.

7. An electrophotographic image forming apparatus comprising:

a document scanner which reads information of an original document to generate electric data;

a photoconductor;

a charger which uniformly provides electric charges onto said photoconductor;

an optical system which optically exposes the photoconductor charged by said charger based on the electric data generated by said document scanner to form an electrostatic latent image;

a developing device which develops the electrostatic latent image with toner to form a toner image on said photoconductor;

an endless transfer member which supports a sheet onto which the toner image formed on said photoconductor is transferred, said endless transfer member moving along a closed loop through a transfer station faced to said photoconductor and being operable to support three sheets during one cyclic movement thereof; and a sequence controller which controls on operation of said image forming apparatus so that, when one set of prints is produced from three pages of an original document, three toner images are successively formed on said photoconductor based on the three pages of the original document, respectively, and transferred onto three sheets supported on said endless transfer member respectively, during one cyclic movement thereof;

when two sets of prints are produced from the three pages of the original document, two toner images of a first page and one toner image of a second page are successively formed on said photoconductor and transferred onto three sheets supported on said endless transfer member, respectively, during one cyclic movement thereof, and then, one toner image of the second page and two toner images of a third page are successively formed on said photoconductor and transferred onto three sheets supported on said endless transfer member, respectively, during one cyclic movement thereof.

8. An electrophotographic image forming apparatus as claimed in claim 7, wherein said endless transfer member includes an endless belt which is provided around at least two support rollers.

9. An image forming apparatus comprising:

an information receiving unit which receives and stores original information of a plurality of pages;

an image retaining member;

an image forming mechanism which forms images on said image retaining member based on the original information stored in said information receiving unit; an endless transfer member onto which the images formed on said image retaining member are transferred, said endless transfer member moving along a closed loop through a transfer station faced to said image retaining member and being operable to support a predetermined number of images during one cyclic movement thereof; and a timing controller which determines how many pages of original information has been received by said information receiving unit and activates said image forming mechanism based on the determination.

10. An image forming apparatus as claimed in claim 9, wherein said timing controller activates said image forming mechanism when a predetermined number of pages of original information is received by said information receiving unit.

11. An image forming apparatus as claimed in claim 9, wherein, when a plurality sets of prints are produced from original information of a plurality of pages, said timing controller decides a number of pages of the original information necessary for one cyclic movement of said endless transfer member and activates said image forming mechanism when the decided number of pages of the original information is received by said information receiving unit.

12. An image forming apparatus as claimed in claim 9, wherein said image retaining member has a photoconductive layer, and said image forming mechanism includes a charger uniformly providing electric charges onto said photoconductive layer, an optical system optically exposing the photoconductive layer charged by said charger based on the original information to form an electrostatic latent image and a developing device developing the electrostatic latent image with toner to form a toner image.

13. An image forming apparatus as claimed in claim 9, wherein said endless transfer member includes an endless belt which is provided around at least two support rollers.

14. An image forming apparatus as claimed in claim 9, wherein said endless transfer member is operable to support a plurality of sheets on which images formed on said image retaining member are transferred, respectively.

15. An image forming apparatus comprising:

a document scanner which reads an original to generate original information;

a memory which receives and stores the original information generated by said document scanner;

an image retaining member;

an image forming mechanism which forms images on said image retaining member based on the original information stored in said information receiving unit;

an endless transfer member onto which the images formed on said image retaining member are transferred, said endless transfer member moving along a closed loop through a transfer station faced to said image retaining member and being operable to support a predetermined number of images during one cyclic movement thereof; and a timing controller which determines a number of pages of the original necessary for causing said endless transfer member to support said predetermined number of images during one cyclic movement of said endless transfer member and activates said image forming mechanism when the determined number of pages of the original have been read by said document scanner.

16. An image forming apparatus as claimed in claim 15, wherein said image retaining member has a photoconductive layer, and said image forming mechanism includes a charger uniformly providing electric charges onto said photoconductive layer, an optical system optically exposing the photoconductive layer charged by said charger based on the original information to form an electrostatic latent image and a developing device developing the electrostatic latent image with toner to form a toner image.

17. An image forming apparatus as claimed in claim 15, wherein said endless transfer member includes an endless belt which is provided around at least two support rollers.

18. An image forming apparatus as claimed in claim 15, wherein said endless transfer member is operable to support a plurality of sheets on which images formed on said image retaining member are transferred respectively.

19. An image forming apparatus comprising:

a document scanner which reads an original to generate original information;

a memory which receives and stores the original information generated by said document scanner;

an image retaining member;

an image forming mechanism which forms images on said image retaining member based on the original information stored in said information receiving unit;

an endless transfer member onto which the images formed on said image retaining member are transferred, said endless transfer member moving along a closed loop through a transfer station faced to said image retaining member and being operable to support a predetermined number of images during one cyclic movement thereof; and a timing controller which determines that a predetermined number of pages of original information has been read by said document scanner and activates said image forming mechanism based on the determination.

20. An image forming apparatus as claimed in claim 19, wherein said image retaining member has a photoconductive layer, and said image forming mechanism includes a charger uniformly providing electric charges onto said photoconductive layer, an optical system optically exposing the photoconductive layer charged by said charger based on the original information to form an electrostatic latent image and a developing device developing the electrostatic latent image with toner to form a toner image.

21. An image forming apparatus as claimed in claim 19, wherein said endless transfer member includes an endless belt which is provided around at least two support rollers.

22. An image forming apparatus as claimed in claim 19, wherein said endless transfer member is operable to support a plurality of sheets on which images formed on said image retaining member are transferred, respectively.

* * * * *

UNITED STATES PATENT AND TRADEMARK OFFICE
CERTIFICATE OF CORRECTION

PATENT NO. : 5,485,257
DATED : January 16, 1996
INVENTOR(S) : Masahide Ueda, et al.

It is certified that error appears in the above-indentified patent and that said Letters Patent is hereby corrected as shown below:

In col. 2, line 43, change "FIG." to --FIGS.--.

In col. 4, line 3, after "exposure" insert --unit--.

In col. 9, line 3, delete "the" (first occurrence).

In col. 9, line 33, after ""2"" insert --(step S35-1)--.

In col. 9, line 34, change "S35-1" to --S35-2--.

In col. 9, line 56, change ""2"" to --"3"--.

In col. 10, line 1, change ""3"" to --"4"--.

In col. 11, line 53 (Claim 1, line 13), change "(x)" to --(X)--.

In col. 12, line 64 (Claim 7, line 21), change "on" to --an--.

Signed and Sealed this

Fourteenth Day of May, 1996

Attest:

BRUCE LEHMAN

*Attesting Officer*  *Commissioner of Patents and Trademarks*